(12) United States Patent
Sugiura et al.

(10) Patent No.: US 10,259,486 B2
(45) Date of Patent: Apr. 16, 2019

(54) FASTENING DEVICE AND STEERING APPARATUS

(71) Applicants: JTEKT CORPORATION, Osaka-shi, Osaka (JP); TOYOTA JIDOSHA KABUSHIKI KAISHA, Toyota-shi, Aichi-ken (JP)

(72) Inventors: Tomonori Sugiura, Yamatokoriyama (JP); Shoji Ishimura, Kashihara (JP); Tatsuro Kubota, Shiki-gun (JP); Yuji Takahashi, Obu (JP); Shigeru Hoshino, Toyota (JP)

(73) Assignees: JTEKT CORPORATION, Osaka-shi (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 133 days.

(21) Appl. No.: 15/642,457

(22) Filed: Jul. 6, 2017

(65) Prior Publication Data

US 2018/0015942 A1 Jan. 18, 2018

(30) Foreign Application Priority Data

Jul. 12, 2016 (JP) ................................ 2016-137835

(51) Int. Cl.
*B62D 1/184* (2006.01)
*B62D 1/185* (2006.01)
(Continued)

(52) U.S. Cl.
CPC ............. *B62D 1/184* (2013.01); *B62D 1/185* (2013.01); *B62D 1/187* (2013.01)

(58) Field of Classification Search
CPC ........ B62D 1/183; B62D 1/184; B62D 1/185; B62D 1/187; B62D 1/189
See application file for complete search history.

(56) References Cited

U.S. PATENT DOCUMENTS

| | | | |
|---|---|---|---|
| 9,393,986 B1 * | 7/2016 | Anspaugh | B62D 1/184 |
| 2004/0134302 A1 * | 7/2004 | Ko | B62D 1/184 |
| | | | 74/493 |

(Continued)

FOREIGN PATENT DOCUMENTS

| | | |
|---|---|---|
| DE | 101 41 551 A1 | 3/2003 |
| EP | 1 932 744 A2 | 6/2008 |

(Continued)

OTHER PUBLICATIONS

Dec. 21, 2017 Search Report issued in European Patent Application No. 17180556.7.

*Primary Examiner* — Barry Gooden, Jr.
(74) *Attorney, Agent, or Firm* — Oliff PLC (57) ABSTRACT

An operating lever is fitted to an operating shaft and pivots with the operating shaft. A first cam brought to pivot by the operating lever and a second cam cam-engaged with the first cam to push a column jacket are supported by the operating shaft. The first cam includes a first projecting portion and a second projecting portion that are disposed on opposite sides of a central axial line in a manner as to face each other in a radial direction. The operating lever has a first hole into which the first projecting portion is fitted and a second hole into which the second projecting portion is fitted. The second hole has a larger dimension than the second projecting portion in the radial direction.

4 Claims, 5 Drawing Sheets

(51) Int. Cl.
*B62D 1/183* (2006.01)
*B62D 1/187* (2006.01)
*B62D 1/189* (2006.01)

(56) References Cited

U.S. PATENT DOCUMENTS

| | | | |
|---|---|---|---|
| 2009/0114055 A1 | 5/2009 | Stroud | |
| 2011/0156380 A1* | 6/2011 | Dietz | B60R 21/09 |
| | | | 280/775 |
| 2014/0260763 A1* | 9/2014 | Buzzard | B62D 1/184 |
| | | | 74/493 |
| 2014/0318304 A1* | 10/2014 | Hahn | B62D 1/184 |
| | | | 74/493 |
| 2015/0225009 A1* | 8/2015 | Sakata | B62D 1/185 |
| | | | 74/493 |
| 2017/0001657 A1* | 1/2017 | Yamada | B62D 1/184 |
| 2017/0072986 A1* | 3/2017 | Ishii | B62D 1/189 |
| 2018/0015942 A1* | 1/2018 | Sugiura | B62D 1/184 |
| 2018/0297624 A1* | 10/2018 | Zhang | B62D 1/184 |

FOREIGN PATENT DOCUMENTS

| | | |
|---|---|---|
| EP | 2 383 165 A2 | 11/2011 |
| JP | 2001-322552 A | 11/2001 |

* cited by examiner

FASTENING DEVICE AND STEERING APPARATUS

INCORPORATION BY REFERENCE

The disclosure of Japanese Patent Application No. 2016-137835 filed on Jul. 12, 2016 including the specification, drawings and abstract is incorporated herein by reference in its entirety.

BACKGROUND

1. Technical Field

The present disclosure relates to a fastening device and a steering apparatus including the fastening device.

2. Description of Related Art

There is used, in a steering apparatus or the like, a mechanism (device) to fix a column tube to a bracket by operating an operating lever to rotate a bolt so as to fasten the bracket. For example, the steering apparatus described in Japanese Patent Application Publication No. 2001-322552 includes a fixing mechanism to fix an upper tube to an upper support bracket. The fixing mechanism includes: a rotatable bolt, an operating lever connected to the bolt via a coupling plate in an integrally rotatable manner; a pair of cam plates assembled onto the bolt so as to be rotatable around the bolt and movable in the axial direction of the bolt; and a stopper. When one cam plate rotates along with a rotating operation of the operating lever, cam projections of the pair of cam plates come into engagement with each other so as to move the other cam plate in the axial direction of the bolt, and thus the other cam plate is pushed and engaged with the upper support bracket. Through this, the upper support bracket is fastened by the other cam plate and the stopper.

SUMMARY

In the steering apparatus of JP 2001-322552 A, in order to assemble the bolt to the operating lever, it is necessary to fit a head portion of the bolt into an engagement hole of the coupling plate, and insert a coupling bolt through a long hole of the coupling plate and a fixing threaded hole of the operating lever. Hence, assembly work of assembling the bolt to the operating lever is complicated. In addition, a pushing force of the other cam plate to push the upper support bracket varies depending on the degree of the engagement between the cam projections of the pair of cam plates (the degree that the cam projections run over each other). Hence, in order to obtain an enough pushing force for fastening the upper support bracket, it is necessary to assemble one cam plate to the operating lever in such a manner that the cam projections sufficiently run over each other in accordance with operation of the operating lever. For this reason, it is required to accurately assemble the one cam plate relative to the operating lever.

This disclosure provides a fastening device capable of promoting enhancement of assemblability and accurately positioning a first cam relative to an operating lever in a circumferential direction, and also provides a steering apparatus including the fastening device.

An aspect of the present disclosure is a fastening device that fastens a fastened member, and the fastening device includes an operating shaft, an operating lever, a first cam, and a second cam. The operating shaft is inserted through the fastened member in a manner as to be pivotable about the central axial line. The operating lever is fitted to the operating shaft in a manner as to be integrally pivotable with the operating shaft, and is operated so as to bring the operating shaft to pivot. The first cam is supported by the operating shaft, and is brought to pivot by the operating lever. The second cam is supported by the operating shaft, and is cam-engaged with the first cam so as to push the fastened member. The first cam includes a first projecting portion and a second projecting portion that are respectively disposed on opposite sides of the central axial line such that the first projecting portion and the second projecting portion face each other in the radial direction. The operating lever has a first hole into which the first projecting portion is fitted and a second hole into which the second projecting portion is fitted. The second hole has a greater dimension in the radial direction than that of the second projecting portion.

According to the above aspect, the operating lever is fitted to the operating shaft in a manner as to integrally pivot with the operating shaft. Therefore, compared with the case of fixing the operating shaft to the operating lever via another member, the assemblability of the operating shaft relative to the operating lever is enhanced. The operating lever has the first hole into which the first projecting portion of the first cam is fitted, and the second hole into which the second projecting portion of the first cam is fitted. The second hole has a greater dimension in the radial direction than that of the second projecting portion. The first projecting portion and the second projecting portion are respectively disposed on the opposite sides of the central axial line so as to face each other in the radial direction. Hence, it is possible to fit the first projecting portion into the first hole, and at the same time, and also to fit the second projecting portion into the second hole while an error in dimension between the first projecting portion and the second projecting portion and an error in dimension between the first hole and the second hole are absorbed in the radial direction. Therefore, not only can adjustment of the dimensions of the operating lever and the first cam and the assembly of the first cam relative to the operating lever be facilitated, but it is also possible to position the first cam relative to the operating lever at two positions. As a result, it is possible to promote enhancement of the assemblability of the first cam relative to the operating lever while accurately positioning the first cam relative to the operating lever.

In the above aspect, the second projecting portion may be fitted into the second hole in a state in which the second projecting portion is in contact with an inner surface of the second hole at two positions with a distance therebetween in the circumferential direction of the operating shaft.

According to the above configuration, the second projecting portion is fitted into the second hole in a state in which the second projecting portion is in contact with the inner surface of the second hole at the two positions with a distance therebetween in the circumferential direction of the operating shaft; therefore, it is possible to more accurately position the first cam relative to the operating lever in the circumferential direction.

In the above aspect, the second hole may be opened outward in the radial direction.

According to the above configuration, because the second hole is opened outward in the radial direction, stress caused in the operating lever due to the fitting of the second projection portion into the second hole is reduced, thereby accurately maintaining the shape of the second hole. Accordingly, it is possible to accurately position the first cam relative to the operating lever.

In the above aspect, a steering apparatus may include: a column jacket to which a steering member is coupled; a bracket that supports the column jacket and is fixed to a vehicle body; and the above-described fastening device, wherein the fastening device may fasten the column jacket as the fastened member via the bracket.

In the above configuration, it is possible to provide the steering apparatus including the fastening device capable of promoting enhancement of assemblability and accurately positioning the first cam relative to the operating lever in the circumferential direction.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Figure 1:
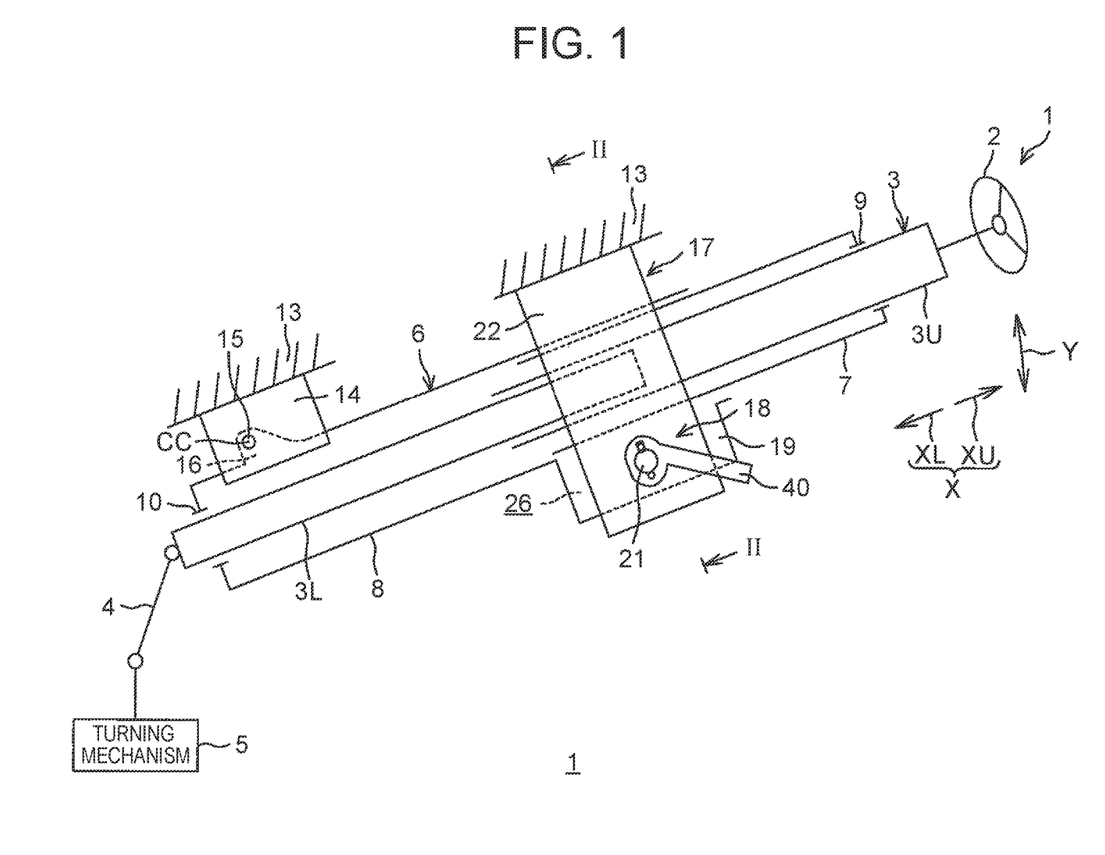
FIG. 1 is a schematic side view of a steering apparatus according to one embodiment of the present disclosure.

Hereinafter, embodiments of the present disclosure will be described in detail with reference to accompanying drawings. FIG. 1 is a schematic side view of a steering apparatus 1 according to one embodiment of the present disclosure. With reference to FIG. 1, the steering apparatus 1 includes: a steering shaft 3; a column jacket 6; an intermediate shaft 4; and a turning mechanism 5. A steering member 2 such as steering wheel is coupled to one end (the upper end in the axial direction) of the steering shaft 3. The steering apparatus 1 turns steered wheels (not shown) in conjunction with steering of the steering member 2. The turning mechanism 5 is a rack and pinion mechanism, for example, but is not limited to this.

Hereinafter, an upward direction in a column axial direction X that is an axial direction of the steering shaft 3 is referred to as an axial upward direction XU, and a lower direction in the column axial direction X is referred to as an axial downward direction XL. The steering shaft 3 includes an upper shaft 3U and a lower shaft 3L each of which has a cylindrical shape. For example, the upper shaft 3U and the lower shaft 3L are fitted to each other in a relatively movable manner through spline-fitting or serration-fitting, for example. The steering member 2 is coupled to one end of the axial upward direction XU of the upper shaft 3U.

The column jacket 6 includes an upper jacket 7 that has the steering member 2 coupled to one end of the upper jacket 7 via the upper shaft 3U, the upper jacket 7 having a cylindrical shape and being movable in the column axial direction X, and the column jacket 6 also includes a lower jacket 8 slidably fitted to the other end side of the upper jacket 7. The lower jacket 8 also serves as an outer jacket. The upper jacket 7 also serves as an inner jacket internally fitted into the lower jacket 8. The column axial direction X is an axial direction of the upper jacket 7, and is also an axial direction of the lower jacket 8. The axial upward direction XU is one end side of the upper jacket 7, and the axial downward direction XL is the other end side of the upper jacket 7.

The steering shaft 3 is inserted into the column jacket 6. The upper shaft 3U is rotatably supported by the upper jacket 7 via a bearing 9, and the lower shaft 3L is rotatably supported by the lower jacket 8 via a bearing 10. The upper shaft 3U slides in the column axial direction X relative to the lower shaft 3L, so that the upper jacket 7 slides in the column axial direction X relative to the lower jacket 8, and the column jacket 6 can be extended or retracted together with the steering shaft 3 in the column axial direction X.

The position of the steering member 2 in the vehicle longitudinal direction can be adjusted by extending or retracting the steering shaft 3 and the column jacket 6 in the column axial direction X. In this manner, the steering apparatus 1 has a telescopic adjustment function. The steering apparatus 1 further includes a fixed bracket 14 fixed to a vehicle body 13, a tilt center shaft 15 supported by the fixed bracket 14, and a column bracket 16 that is fixed to an outer circumference of the lower jacket 8, and is rotatably supported by the tilt center shaft 15. The steering shaft 3 and the column jacket 6 are pivotally movable in a tilt direction Y (substantially the vertical direction) about a tilt center CC that is a central axial line of the tilt center shaft 15 as a fulcrum thereof.

By bringing the steering shaft 3 and the column jacket 6 to pivot about the tilt center CC, it is possible to adjust the position of the steering member 2 in the vertical direction (the height direction). In this manner, the steering apparatus 1 has a tilt adjustment function. The steering apparatus 1 further includes a bracket 17 that is fixed to the vehicle body 13 and supports the lower jacket 8. The steering apparatus 1 is equipped with a fastening device 18 according to one embodiment of this disclosure. That is, the steering apparatus 1 further includes the fastening device 18 that fastens the column jacket 6 as a fastened member to lock the position of the column jacket 6 after the tilt adjustment and the telescopic adjustment. Specifically, the fastening device 18 fastens a pair of fastened portions 19 integrally provided to an upper part in the column axial direction X of the lower jacket 8 of the column jacket 6 via the bracket 17. The pair of fastened portions 19 is part of the column jacket 6.

Figure 2:
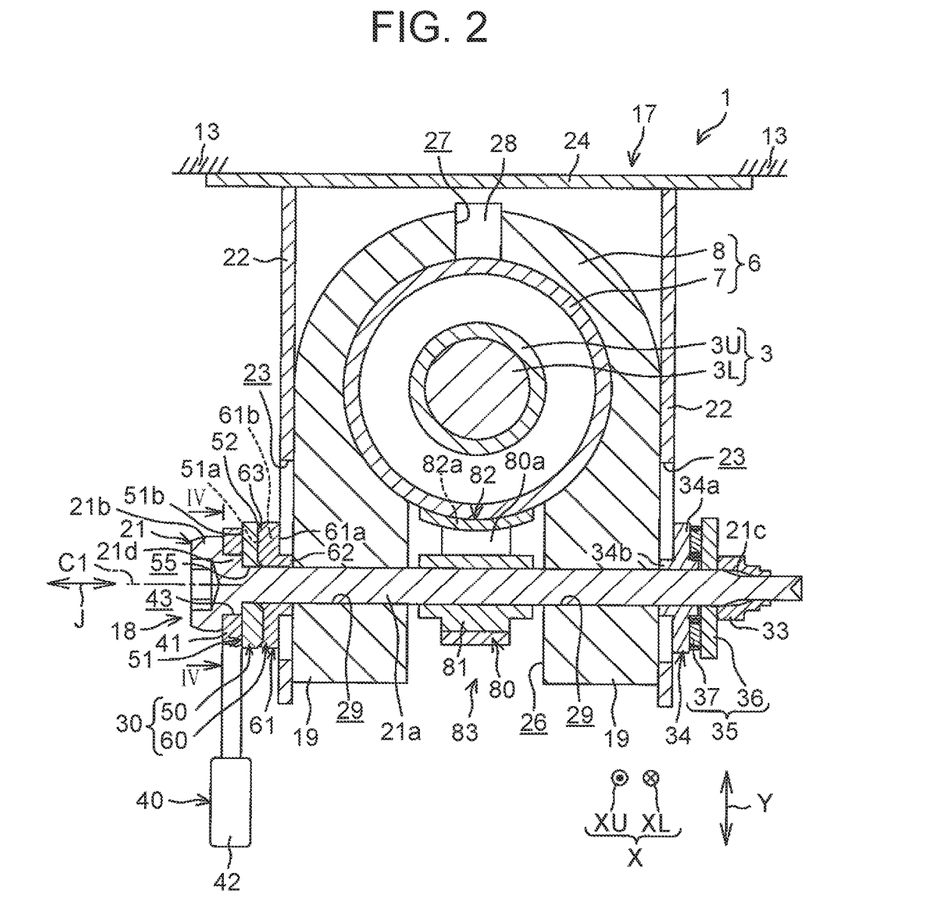
FIG. 2 is a schematic view of a cross section taken along line II-II of FIG. 1.
Figure 3:
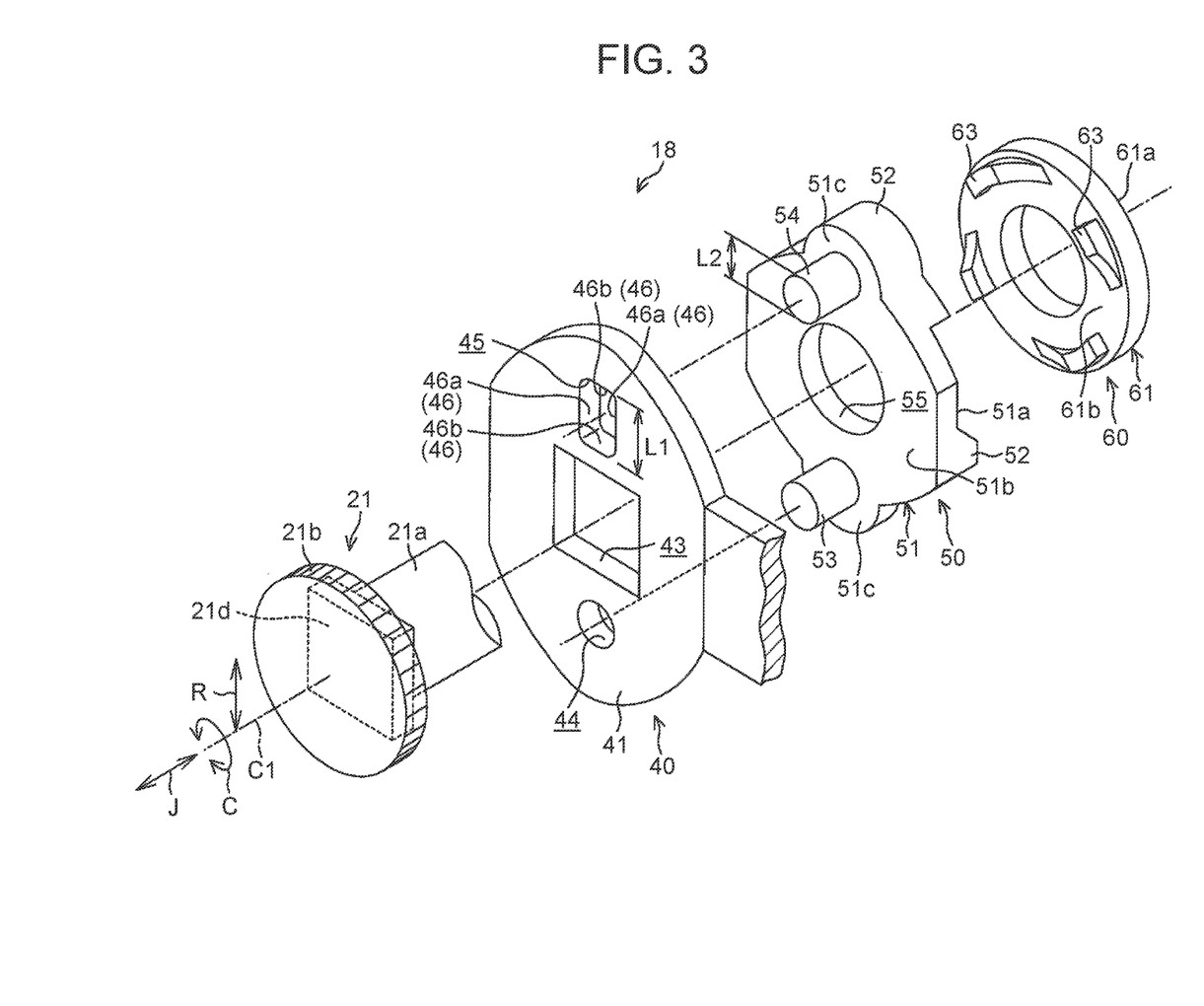
FIG. 3 is a schematic exploded perspective view of one member of a fastening device.

FIG. 2 is a schematic view of a cross section taken along line II-II of FIG. 1. FIG. 3 is a schematic exploded perspective view of one member of the fastening device 18. With reference to FIG. 2, the lower jacket 8 is formed with a slit 26 extending from the upper end in the column axial direction X of the lower jacket 8 in the axial downward direction XL. The pair of fastened portions 19 is provided. One of the fastened portions 19 is disposed on one side of the slit 26 and the other one of the fastened portions 19 is disposed on the other side of the slit 26. The pair of fastened portions 19 extends from the upper end in the column axial direction X of the lower jacket 8 downward in the tilt direction Y (also see FIG. 1). The lower end in the tilt direction Y of the slit 26 communicates with a space outside the slit 26. The fastening device 18 is fixed to the pair of fastened portions 19. The fastening device 18 fastens the pair of fastened portions 19, thereby elastically reducing the diameter of the lower jacket 8.

The bracket 17 includes a fixed plate 24 fixed to the vehicle body 13, and a pair of side plates 22 extending downward in the tilt direction Y from both ends of the fixed plate 24. Each side plate 22 is formed with a tilt long hole 23 extending in the tilt direction Y. The pair of fastened portions 19 of the lower jacket 8 is disposed between the pair of side plates 22, and each fastened portion 19 has a platy shape extending along an inner surface of the corresponding side plate 22. Each fastened portion 19 is formed with an operating-shaft insertion hole 29 in a circular shape.

The lower jacket 8 is formed with a guide groove 27 extending in the column axial direction X, and a guided projection 28 fixed to the upper jacket 7 is fitted into the guide groove 27. The guide groove 27 guides movement of the upper jacket 7 in the column axial direction X via the guided projection 28, while restricting the rotation of the upper jacket 7 relative to the lower jacket 8. During the telescopic adjustment, an end portion in the axial upward direction XU of the guide groove 27 abuts to the guided projection 28. Through this, the upper jacket 7 is prevented from coming out from the lower jacket 8.

The fastening device 18 includes an operating shaft 21 pivotable about a central axial line C1, and an operating lever 40 that is operated in order to bring the operating shaft 21 to pivot. A direction in which the central axial line C1 of the operating shaft 21 extends is referred to as an operation-axial direction J. The operating shaft 21 is a bolt, for example. The operating shaft 21 is inserted through the respective tilt long holes 23 of the both side plates 22 of the bracket 17. The operating shaft 21 is inserted through respective operating-shaft insertion holes 29 of the both fastened portions 19 of the lower jacket 8. That is, the operating shaft 21 is inserted through the pair of fastened portions 19 of the column jacket 6 that is the fastened member. The operating shaft 21 and the lower jacket 8 relatively move relative to the bracket 17 during the tilt adjustment. At this time, the operating shaft 21 moves in the inside of the tilt long holes 23 in the tilt direction Y. The operating shaft 21 integrally includes a shaft portion 21a in a substantially columnar shape, a head portion 21b provided at one end in the operation-axial direction J of the shaft portion 21a, and a threaded portion 21c provided at the other end in the operation-axial direction J of the shaft portion 21a.

The operating lever 40 is a member formed by pressing a metallic plate, for example. The operating lever 40 includes a base end portion 41 that is one longitudinal end thereof, and a handle portion 42 that is the other longitudinal end thereof. The base end portion 41 of the operating lever 40 is an annular shape extending in a radial direction R centering about the central axial line C1. Hereinafter, a direction extending toward the central axial line C1 of the radial direction R is referred to as an internal direction, and a direction extending apart from the central axial line C1 of the radial direction R is referred to as an external direction.

The base end portion 41 of the operating lever 40 is fixed to a fixing portion 21d provided in the vicinity of the head portion 21b of the operating shaft 21. The operating lever 40 is so fitted in the operating shaft 21 as to be integrally pivotable with the operating shaft 21. Specifically, with reference to FIG. 3, the operating lever 40 is formed with a through-hole 43 that extends through the base end portion 41 in the operation-axial direction J and has a rectangular shape as viewed from the operation-axial direction J; and the fixing portion 21d of the operating shaft 21 has a rectangular shape as viewed from the operation-axial direction J so as to be fitted into the through-hole 43. As long as the operating lever 40 and the operating shaft 21 are configured to be integrally pivotable, the through-hole 43 and the fixing portion 21d do not necessarily need to have a rectangular shape as viewed from the operation-axial direction J, and may have a polygonal shape other than a rectangular shape as viewed from the operation-axial direction J. Each of the through-hole 43 and the fixing portion 21d may have width across flats so that the operating lever 40 and the operating shaft 21 are integrally pivotable with each other. In addition, the operating lever 40 and the operating shaft 21 may be coupled to each other through a serration fitting or a spline fitting such that the operating lever 40 and the operating shaft 21 are integrally pivotable with each other.

The base end portion 41 of the operating lever 40 is formed with a first hole 44 and a second hole 45 that extend through the base end portion 41 in the operation-axial direction J. A first hole 44 has a circular shape as viewed from the operation-axial direction J. A second hole 45 has a shape longitudinally long in the radial direction R. The first hole 44 and the second hole 45 are disposed on both side of the central axial line C1 in a manner as to face each other in the radial direction R with the central axial line C1 interposed therebetween. In other words, the first hole 44 and the second hole 45 are disposed at respective positions 180° apart from each other in a circumferential direction C about the central axial line C1.

With reference to FIG. 2, the fastening device 18 is interposed between the head portion 21b of the operating shaft 21 and one side plate 22 (the left side plate 22 in FIG. 2), and further includes a force-converting mechanism 30 that converts an operation torque of the operating lever 40 into an axial force (a fastening force to fasten the pair of side plates 22) of the operating shaft 21. The force-converting mechanism 30 includes: a first cam 50 that is brought to pivot by the operating lever 40, and is restricted from moving in the operation-axial direction J; and a second cam 60 that is cam-engaged with the first cam 50 so as to push one fastened portion 19 (the left fastened portion 19 in FIG. 2) of the column jacket 6 as the fastened member via one side plate 22. The first cam 50 and the second cam 60 are supported by an outer circumference of the shaft portion 21a of the operating shaft 21. The first cam 50 is adjacent to the base end portion 41 of the operating lever 40 from an opposite side to the head portion 21b of the operating shaft 21 in the operation-axial direction J. The second cam 60 is adjacent to the first cam 50 from an opposite side to the base end portion 41 of the operating lever 40 in the operation-axial direction J. The second cam 60 is disposed between the first cam 50 and one side plate 22 in the operation-axial direction J.

With reference to FIG. 3, the first cam 50 is a sintered compact, for example. The first cam 50 includes: a main body 51 in an annular shape extending in the radial direction R; first cam projections 52 formed on a first surface 51a that is a surface on the second cam 60 side in the main body 51; and a first projecting portion 53 and a second projecting portion 54 each of which is formed on a second surface 51b that is a surface on the base end portion 41 side of the operating lever 40 in the main body 51, and each of the first projecting portion 53 and the second projecting portion 54 has a cylindrical shape. The first cam 50 includes a through-hole 55 in a circular shape centering about the central axial line C1. The first projecting portion 53 and the second projecting portion 54 are respectively disposed on the opposite sides of the central axial line C1 in a manner as to face each other in the radial direction R with the central axial line C1 interposed therebetween. In other words, the first projecting portion 53 and the second projecting portion 54 are disposed at respective positions 180° apart from each other in the circumferential direction C about the central axial line C1. Each of the portions 51c where the first projecting portion 53 and the second projecting portion 54 are respectively formed in the main body 51 may have a projecting form projecting more outward in the radial direction R than the other portions of the main body 51. As will be described in detail later, the first cam 50 is fitted to the operating shaft 21 in a manner as to integrally pivot with the operating shaft 21.

The second cam 60 is a sintered compact, for example. The second cam 60 includes: a main body 61 extending in the radial direction R centering about the central axial line C1; a cylindrical boss portion 62 formed in a first surface 61*a* that is a surface on one side plate 22 side (the left side plate 22 in FIG. 2) in the main body 61; and second cam projections 63 over which the first cam projections 52 run, the second cam projections 63 being formed on a second surface 61*b* that is a surface on the first cam 50 side in the main body 61. The main body 61 faces the one side plate 22 from the operation-axial direction J.

The fastening device 18 includes: a nut 33 screwed with the threaded portion 21*c* provided at the other end of the operating shaft 21; a pushing member 34 that pushes the other side plate 22 (the right side plate 22 in FIG. 2); and an interposed member 35 interposed between the pushing member 34 and the nut 33. The interposed member 35 includes a washer 36 and a needle roller bearing 37. The pushing member 34 includes an abutting plate 34*a* that abuts to the other side plate 22, and a boss portion 34*b* projecting from the abutting plate 34*a*.

The pushing member 34 and the interposed member 35 are supported by an outer circumference of the operating shaft 21. The boss portion 62 of the second cam 60 on one side and the boss portion 34*b* of the pushing member 34 are fitted into the corresponding tilt long holes 23 so as to be respectively restricted from rotating. Along with the pivoting of the operating lever 40 in the locking direction, when the first cam 50 pivots relative to the second cam 60, the second cam 60 moves in a direction apart from the first cam 50 along the operation-axial direction J. Through this, the second cam 60 and the pushing member 34 respectively push the pair of side plates 22 of the bracket 17, thereby fastening the pair of side plates 22.

At this time, since the respective side plates 22 of the bracket 17 fasten the corresponding fastened portions 19 of the lower jacket 8, the movement of the lower jacket 8 in the tilt direction Y is restricted, thus attaining the tilt lock. Moreover, when the both fastened portions 19 are fastened, the lower jacket 8 elastically reduces the diameter thereof so as to fasten the upper jacket 7. Through this, the movement of the upper jacket 7 in the column axial direction X is restricted, thus attaining the telescopic lock. In this manner, in the fastening device 18, the telescopic lock is attained by friction between the both jackets 7 and 8.

A state of the steering apparatus 1 when the position of the steering member 2 is fixed in the tilt direction Y and the column axial direction X, that is, when the tilt lock and the telescopic lock are attained is referred to as a "lock state". In the meantime, when the operating lever 40 pivots in a unlocking direction, along with the pivoting of the first cam 50, the second cam 60 moves in a direction approaching the first cam 50 along the operation-axial direction J. Through this, the fastening of the pair of side plates 22 by the second cam 60 and the pushing member 34 is unlocked, thus enabling the tilt adjustment and the telescopic adjustment.

In a state of the steering apparatus 1 when the position fixing of the steering member 2 in the tilt direction Y and the column axial direction X is unlocked, that is, when the tilt lock and the telescopic lock are unlocked is referred to as a "unlock state". The steering apparatus 1 may further include a tooth lock mechanism 83 to firmly fix a relative position between the upper jacket 7 and the lower jacket 8 in the telescopic direction (the column axial direction X). The tooth lock mechanism 83 includes: a lock member 80; a cam member 81; and a lock plate 82 in a platy shape extending in the column axial direction X. The lock member 80, the cam member 81, and the lock plate 82 are arranged between the pair of fastened portions 19 as viewed from the column axial direction X. The lock member 80 is rotatably supported to a shaft (not shown) supported by the lower jacket 8. The lock plate 82 is fixed to the upper jacket 7. The operating shaft 21 is inserted through the cam member 81, and this cam member 81 is supported by the outer circumference of the shaft portion 21*a* of the operating shaft 21 in a manner as to integrally pivoting with the operating shaft 21. The cam member 81 transmits pivoting of the operating shaft 21 to the lock member 80. The tooth lock mechanism 83 may include a spring (not shown) to urge the lock member 80 toward the lock plate 82.

Figure 4:
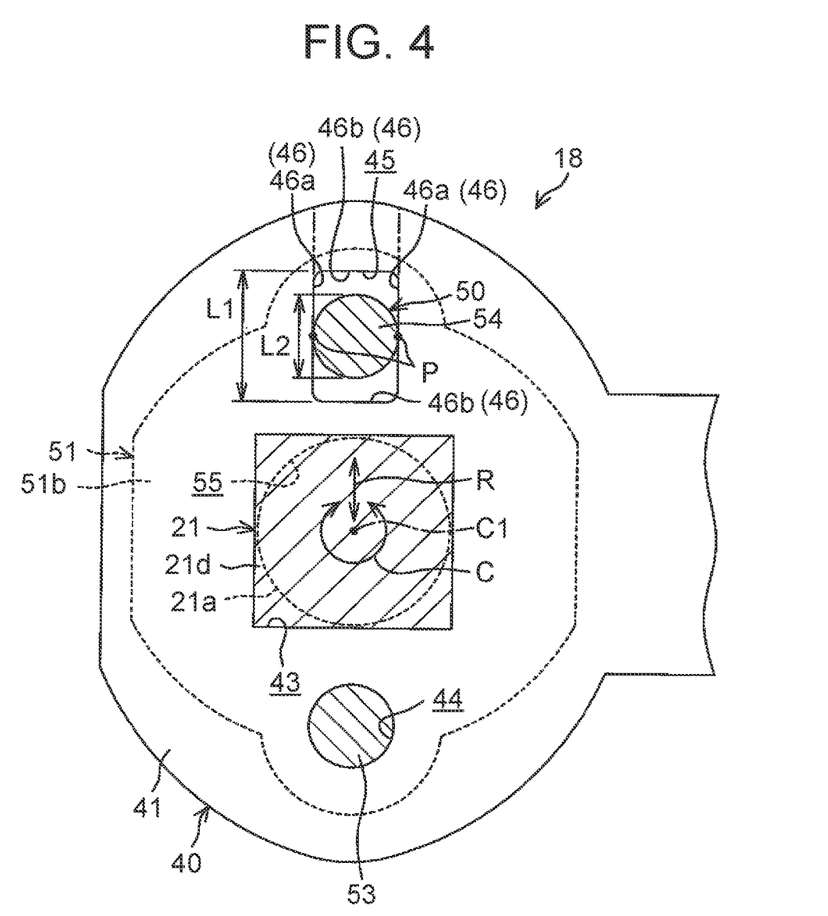
FIG. 4 is a schematic view of a cross section taken along line IV-IV of FIG. 2.

In the lock state, a tooth portion 80*a* provided to the lock member 80 and a tooth portion 82*a* provided to the lock plate 82 mesh with each other. Through this, the position of the steering member 2 (see FIG. 1) in the column axial direction X is firmly locked. In the unlocked state, the meshing between the tooth portion 80*a* and the tooth portion 82*a* is unlocked. FIG. 4 is a schematic view of a cross section taken along line IV-IV of FIG. 2.

The first projecting portion 53 is fitted into the first hole 44 in a press-fitted state. The second projecting portion 54 is fitted into the second hole 45 in a press-fitted state. Through this, the first cam 50 and the operating lever 40 are coupled to each other in an integrally pivotable manner. The second hole 45 at least has a greater dimension than that of the second projecting portion 54 in the radial direction R. A dimension L1 in the radial direction R of the second hole 45 is greater than a dimension L2 in the radial direction R of the second projecting portion 54. An inner surface 46 of the second hole 45 includes a pair of circumferential defining surfaces 46*a* that define the second hole 45 from both sides of the circumferential direction C (strictly, an orthogonal direction relative to a direction in which the first projecting portion 53 and the second projecting portion 54 face each other), and a pair of radial defining surfaces 46*b* that define the second hole 45 from both sides of the radial direction R. The pair of circumferential defining surfaces 46*a* linearly extends in a direction parallel to the radial direction R.

The second projecting portion 54 is fitted in the second hole 45 in a state in which the second projecting portion 54 is in contact with the circumferential defining surfaces 46*a* of the inner surface 46 of the second hole 45 at two positions with a distance therebetween in the circumferential direction C. In the present embodiment, the pair of circumferential defining surfaces 46*a* linearly extends in a direction parallel to the radial direction R, and the second projecting portion 54 is formed in a columnar-shaped manner. Hence, the second projecting portion 54 is in linear contact with each of the circumferential defining surfaces 46*a*, and a contact part P between the second projecting portion 54 and each circumferential defining surface 46*a* is a linear form extending in the operation-axial direction J. Due to the contact between the second projecting portion 54 and the pair of circumferential defining surfaces 46*a*, a pushing force is applied to the second projecting portion 54 and the pair of circumferential defining surfaces 46*a*, so that at least one of the second projecting portion 54 and the pair of circumferential defining surfaces 46*a* might become slightly deformed. In this case, the second projecting portion 54 and each of the circumferential defining surfaces 46*a* come into surface contact with each other. Different from the present embodiment, the second hole 45 may be opened outward in the radial direction R, as indicated by a two-dot chain line of FIG. 4.

According to this embodiment, the operating lever 40 is so fitted through the operating shaft 21 as to integrally pivot with the operating shaft 21. Therefore, compared with the case of fixing the operating shaft 21 to the operating lever 40 via another member (e.g. a coupling plate described in JP 2001-322552 A), it is facilitated to assemble the operating shaft 21 to the operating lever 40. That is, the assemblability of the operating shaft 21 relative to the operating lever 40 is enhanced. In addition, compared with the case of fixing the operating shaft 21 to the operating lever 40 via another member, it is possible to reduce the number of components.

The operating lever 40 is formed with the first hole 44 into which the first projecting portion 53 of the first cam 50 is fitted, and also with the second hole 45 into which the second projecting portion 54 of the first cam 50 is fitted, the second hole 45 having a greater dimension in the radial direction R than that of the second projecting portion 54. The first projecting portion 53 and the second projecting portion 54 are respectively disposed on the opposite sides of the central axial line C1 in a manner as to face each other in the radial direction R. Hence, it is possible to fit the first projecting portion 53 into the first hole 44, and at the same time, also possible to fit the second projecting portion 54 into the second hole 45 while an error in dimension (deviation in pitch) between the first projecting portion 53 and the second projecting portion 54 and an error in dimension between the first hole 44 and the second hole 45 are absorbed in the radial direction R. Therefore, not only can the dimensional adjustment between the operating lever 40 and the first cam 50 and the assembly of the first cam 50 relative to the operating lever 40 be facilitated, but it is also possible to position the first cam 50 relative to the operating lever 40 at two positions. As a result, it is possible to promote enhancement of the assemblability of the first cam 50 relative to the operating lever 40 while accurately positioning the first cam 50 relative to the operating lever 40.

As aforementioned, it is possible to promote enhancement of the assemblability as well as accurately position the first cam 50 relative to the operating lever 40. In addition, it is possible to absorb the error in dimension by the second hole 45 that is longitudinally long in the radial direction R, thus suppressing that the second projecting portion 54 is fitted into the second hole 45 with a too strong force. Hence, it is possible to reduce stress received by the first cam 50 from the operating lever 40. As with the present embodiment, if the first cam 50 is a sintered compact and the operating lever 40 is formed by pressing a metallic plate, the first cam 50 has a smaller strength than that of the operating lever 40. Even in such a case, the stress received by the first cam 50 is reduced, thus suppressing breakage of the first cam 50.

Since the operating shaft 21 is not inserted into the through-hole 55 of the first cam 50 in a press-fitted state, it is possible to reduce stress caused in the main body 51 of the first cam 50. Accordingly, it is possible to suppress breakage of the first cam 50 even if the first cam 50 is a sintered compact as with the present embodiment. Since the second projecting portion 54 is fitted into the second hole 45 in a state in which the second projecting portion 54 is in contact with the inner surface 46 of the second hole 45 at two positions with a distance therebetween in the circumferential direction C of the operating shaft 21, it is possible to further accurately position the first cam 50 relative to the operating lever 40 in the circumferential direction C.

Since the first projecting portion 53 has a columnar shape, and the first hole 44 has a circular shape as viewed from the operation-axial direction J, it is possible to promote enhancement of the positioning accuracy of the first cam 50 relative to the operating lever 40 in both the circumferential direction C and the radial direction R. In this case, the first cam 50 might be considered to pivot about the first projecting portion 53, but the pair of circumferential defining surfaces 46a of the inner surface 46 of the second hole 45 functions as a pair of restricting surfaces to restrict the pivoting of the first cam 50 about the first projecting portion 53.

The operating lever 40 is coupled to the operating shaft 21 such that relative rotation is disabled, and the first cam 50 is accurately positioned relative to the operating lever 40 in the circumferential direction C, and thus it is possible to accurately position, in the circumferential direction C, the cam member 81 and the first cam 50 that are supported by the operating shaft 21 in an integrally pivotable manner. Accordingly, it is easy to adjust the relative position between the cam member 81 and the first cam 50 in the circumferential direction C such that the tooth portion 80a of the lock member 80 and the tooth portion 82a of the lock plate 82 come into mesh with each other in the locked state.

Each of the first hole 44 and the second hole 45 is a hole whose entire circumference is defined as viewed from the operation-axial direction J. Hence, if the operating lever 40 is formed by pressing a metallic plate, compared with the case in which each of the first hole 44 and the second hole 45 is a hole partially opened as viewed from the operation-axial direction J, the first hole 44 and the second hole 45 are more accurately formed. Accordingly, it is possible to accurately position the first cam 50 relative to the operating lever 40.

In the meantime, in the configuration of the second hole 45 opened outward in the radial direction R as indicated by the two-dot chain line in FIG. 4, the stress caused in the operating lever 40 by fitting the second projecting portion 54 into the second hole 45 is reduced, thereby accurately maintaining the shape of the second hole 45. Accordingly, it is possible to accurately position the first cam 50 relative to the operating lever 40. This disclosure is not limited to the above described embodiment, but may be variously changed within the scope of the claims.

For example, in the present embodiment, it is configured that the first projecting portion 53 has a columnar shape, and the first hole 44 has a circular shape as viewed from the operation-axial direction J; but as long as the first projecting portion 53 is fitted into the first hole 44 in a press-fitted state, the shapes of the first projecting portion 53 and the first hole 44 may be changed. For example, the first projecting portion 53 may have a polygonal columnar shape such as a quadrangular prism shape, or a substantially semicircular arc shape (D shape) as viewed from the operation-axial direction J, or the first hole 44 may have a polygonal columnar shape such as a quadrangular prism shape as viewed from the operation-axial direction J.

Figure 5:
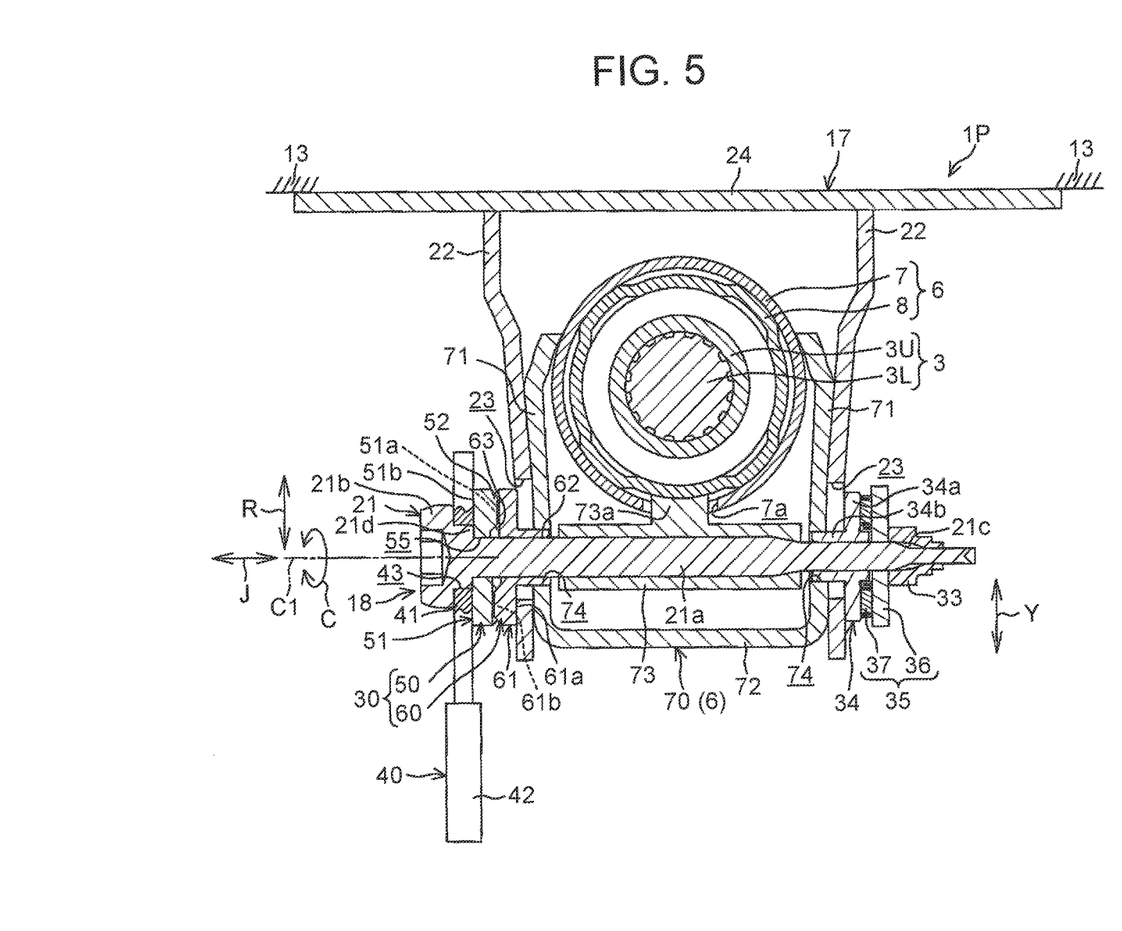
FIG. 5 is a schematic view of a cross section of the steering apparatus according to a variation of the present embodiment.

Moreover, in the present embodiment, the second projecting portion 54 is formed in a columnar shape, but the shape of the second projecting portion 54 may be changed as long as the second projecting portion 54 can absorb the error in dimension and is fitted into the second hole 45 in a state in which the movement thereof is restricted in the circumferential direction C. For example, the second projecting portion 54 may have a polygonal columnar shape such as a quadrangular prism shape, or may have a substantially semicircular arc shape (D shape) as viewed from the operation-axial direction J. With reference to FIG. 5 showing a variation of the present embodiment, the fastening device 18 may also be applied to a steering apparatus 1P in a manner of having no pair of fastened portions 19 in the lower jacket 8. In FIG. 5, the same reference numerals are applied to components that are the same as those in the above description, and detailed description thereof will be omitted.

The column jacket 6 of the steering apparatus 1P includes the upper jacket 7 as the outer jacket, the lower jacket 8 as the inner jacket, and a column bracket 70 provided at an upper end of the upper jacket 7 in the column axial direction X. The column bracket 70 includes a pair of side plates 71 that are fixed to an outer circumference of the upper jacket 7 through welding or the like, and a coupling plate 72 that couples these side plates 71 to each other.

Each of the side plates 71 is formed with a telescopic long hole 74 longitudinally long in the column axial direction X. The operating shaft 21 is inserted through the telescopic long hole 74 of the column bracket 70 of the column jacket 6 as the fastened member. The boss portion 62 of the second cam 60 and the boss portion 34b of the pushing member 34 are respectively fitted into the corresponding tilt long hole 23 and telescopic long hole 74. The fastening device 18 fastens the pair of side plates 71 of the column bracket 70 of the column jacket 6 as the fastened member via the pair of side plates 22 of the bracket 17. Through this, the movement of the upper jacket 7 in the tilt direction Y is restricted, thereby attaining the tilt lock. In addition, the pair of side plates 71 is fastened so as to restrict the movement of the upper jacket 7 in the column axial direction X, thereby attaining the telescopic lock.

In this variation, there is provided a pushing cam 73 to push the lower jacket 8 against the upper jacket 7. The shaft portion 21a of the operating shaft 21 is inserted through the pushing cam 73, and the pushing cam 73 is supported by the operating shaft 21 in a manner as to be integrally pivotable with the operating shaft 21. An end portion 73a of the pushing cam 73 located at an outward position in the radial direction R is inserted through a through-hole 7a provided to the upper jacket 7 in a manner as to be in contact with an outer surface of the lower jacket 8.

According to this variation, the same effect as that of the present embodiment can be attained. In addition, the operating lever 40 and the operating shaft 21 are coupled to each other such that relative rotation is disabled, and the first cam 50 is accurately positioned to the operating lever 40 in the circumferential direction C; therefore, it is possible to accurately position, in the circumferential direction C, the pushing cam 73 and the first cam 50 that are supported by the operating shaft 21 in a manner as to be integrally pivotable with the operating shaft 21. Accordingly, it is easy to adjust the relative position between the pushing cam 73 and the first cam 50 in the circumferential direction C in such a manner that the pushing cam 73 pushes the lower jacket 8 against the upper jacket 7 in the locked state.

Each of the steering apparatuses 1, 1P is not limited to a steering apparatus of a manual type in which the steering of the steering member 2 is not assisted, and may be an electric power steering apparatus of a column-assist type in which the steering of the steering member 2 is assisted by an electric motor. In addition, the present disclosure may be variously changed within the scope of the claims of the present disclosure.

What is claimed is:

1. A fastening device that fastens a fastened member, the fastening device comprising:
an operating shaft that is inserted through the fastened member in a manner as to be pivotable about a central axial line;
an operating lever that is fitted to the operating shaft in a manner as to be integrally pivotable with the operating shaft, and is operated so as to bring the operating shaft to pivot;
a first cam that is supported by the operating shaft, and is brought to pivot by the operating lever; and
a second cam that is supported by the operating shaft, and is cam-engaged with the first cam so as to push the fastened member,
wherein:
the first cam includes a first projecting portion and a second projecting portion that are respectively disposed on opposite sides of the central axial line such that the first projecting portion and the second projecting portion face each other in a radial direction; and
the operating lever has a first hole into which the first projecting portion is fitted and a second hole into which the second projecting portion is fitted, the second hole having a greater dimension in the radial direction than that of the second projecting portion.

2. The fastening device according to claim 1, wherein the second projecting portion is fitted into the second hole in a state in which the second projecting portion is in contact with an inner surface of the second hole at two positions with a distance between the two positions in a circumferential direction of the operating shaft.

3. The fastening device according to claim 1, wherein the second hole is opened outward in the radial direction.

4. A steering apparatus comprising:
a column jacket to which a steering member is coupled;
a bracket that supports the column jacket and is fixed to a vehicle body; and
the fastening device according to claim 1,
wherein the fastening device fastens the column jacket as the fastened member via the bracket.

* * * * *